(12) United States Patent
Lin et al.

(10) Patent No.: US 8,736,991 B2
(45) Date of Patent: May 27, 2014

(54) COLOR FILTER ARRAY AND MANUFACTURING METHOD THEREOF

(75) Inventors: Shiuan-Fu Lin, New Taipei (TW); Cheng-Yue Lin, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 126 days.

(21) Appl. No.: 13/313,013

(22) Filed: Dec. 7, 2011

(65) Prior Publication Data

US 2013/0038958 A1    Feb. 14, 2013

(30) Foreign Application Priority Data

Aug. 12, 2011 (TW) .............................. 100128930 A

(51) Int. Cl.
*G02B 5/22* (2006.01)
(52) U.S. Cl.
USPC ............................ 359/885; 359/891; 359/892
(58) Field of Classification Search
None
See application file for complete search history.

(56) References Cited

U.S. PATENT DOCUMENTS 7,214,959 B2   5/2007  Seki et al.
8,029,850 B2 * 10/2011 Ishii ................................ 427/66

FOREIGN PATENT DOCUMENTS

| JP | 2002-156520 A | 5/2002 |
|---|---|---|
| TW | 588196 | 5/2004 |
| TW | 200642125 | 12/2006 |
| TW | 201106027 A1 | 2/2011 |

OTHER PUBLICATIONS

"Office Action of Taiwan Counterpart Application", issued on Dec. 9, 2013, pp. 1-10.

* cited by examiner

*Primary Examiner* — Jade R Chwasz
(74) *Attorney, Agent, or Firm* — Jianq Chyun IP Office

(57) ABSTRACT

A color filter array includes a substrate, a light shielding layer, and color filter patterns. The light shielding layer is on the substrate and has openings exposing a surface of the substrate. Besides, the light shielding layer has a height H. The color filter patterns are located in the openings of the light shielding layer. Each color filter pattern has the maximum film thickness Lc and the minimum film thickness Ls, and the difference between the maximum film thickness Lc and the minimum film thickness Ls is ΔL. The maximum film thickness Lc of each color filter pattern satisfies (m×H)<Lc<(n×H), wherein m comprises about 0.83, n comprises about 0.91, the height H of the light shielding layer satisfies a<H<b, wherein a comprises about 1.6 um and b comprises 2.22 um, and the difference ΔL is less than about 0.39 um.

17 Claims, 4 Drawing Sheets

COLOR FILTER ARRAY AND MANUFACTURING METHOD THEREOF

CROSS-REFERENCE TO RELATED APPLICATION

This application claims the priority benefit of Taiwan application serial no. 100128930, filed on Aug. 12, 2011. The entirety of the above-mentioned patent application is hereby incorporated by reference herein and made a part of this specification.

BACKGROUND OF THE INVENTION

1. Field of the Invention

The invention relates to a color filter array and a manufacturing method thereof. More particularly, the invention relates to a color filter array formed by performing an inkjet printing (IJP) process and a manufacturing method of the color filter array.

2. Description of Related Art

A color filter array of a normal display device is manufactured by performing a spinning coating process and a photolithography process to form red, green, and blue photo resist patterns that are arranged in arrays. However, the spinning coating process is prone to waste most color photo resist material, and costs of performing the photolithography process are high. Recently, a method of forming a color filter array by performing an inkjet printing (IJP) process has been developed. In the IJP process, red, green, and blue inks can be simultaneously injected into certain unit regions. In comparison with the conventional photolithography process, the IJP process requires reduced costs and manufacturing time.

However, when the color filter array is formed by performing the IJP process, the cohesion of the color ink itself is greater than the adhesion between the color ink and a substrate, and therefore the unit regions cannot be evenly or flatly filled with the color ink. As a result, after the color ink is solidified to form color filter patterns, the color filter patterns may have different film thickness, thus deteriorating color display performance of a display.

SUMMARY OF THE INVENTION

Accordingly, the invention is directed to a color filter array and a manufacturing method thereof capable of lessening the difference in film thickness of color filter patterns and improving color display performance of a display.

The invention provides a color filter array that includes a substrate, a light shielding layer, and a plurality of color filter patterns. The light shielding layer is located on the substrate and has a plurality of openings exposing a surface of the substrate. Besides, the light shielding layer has a height H. The color filter patterns are respectively located in the openings of the light shielding layer. Each of the color filter patterns has the maximum film thickness Lc and the minimum film thickness Ls, and the difference between the maximum film thickness Lc and the minimum film thickness Ls is $\Delta L$. The maximum film thickness Lc of each color filter pattern satisfies $(m \times H) < Lc < (n \times H)$, wherein m comprises about 0.83, n comprises about 0.91, the height H of the light shielding layer satisfies $a < H < b$, wherein a comprises about 1.6 um and b comprises 2.22 um, and the difference $\Delta L$ is less than about 0.39 um.

The invention further provides a manufacturing method of a color filter array. In this manufacturing method, a substrate is provided. A light shielding layer is formed on the substrate. The light shielding layer has a plurality of openings, and the openings expose a surface of the substrate. The light shielding layer has a height H. An inkjet printing (IJP) process is performed to inject color filter ink into the openings of the light shielding layer. A solidifying process is performed to solidify the color filter ink to form a plurality of color filter patterns. Each of the color filter patterns has the maximum film thickness Lc and the minimum film thickness Ls, and the difference between the maximum film thickness Lc and the minimum film thickness Ls is $\Delta L$. Specifically, the maximum film thickness Lc of each of the color filter patterns satisfies $(m \times H) < Lc < (n \times H)$, wherein m comprises about 0.83, n comprises about 0.91, the height H of the light shielding layer satisfies $a < H < b$, wherein a comprises about 1.6 um and b comprises 2.22 um, and the difference $\Delta L$ is less than about 0.39 um.

Based on the above, the maximum film thickness Lc of each of the color filter patterns satisfies $(m \times H) < Lc < (n \times H)$, wherein m comprises about 0.83, n comprises about 0.91, the height H of the light shielding layer satisfies $a < H < b$, wherein a comprises about 1.6 um and b comprises 2.22 um, and the difference $\Delta L$ is less than about 0.39 um. Since the difference $\Delta L$ between the maximum film thickness Lc and the minimum film thickness Ls of each of the color filter patterns is less than about 0.39 um, the film thickness of each of the color filter patterns can be even and uniform, and further the display having the color filter array can have favorable color display performance.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1A:
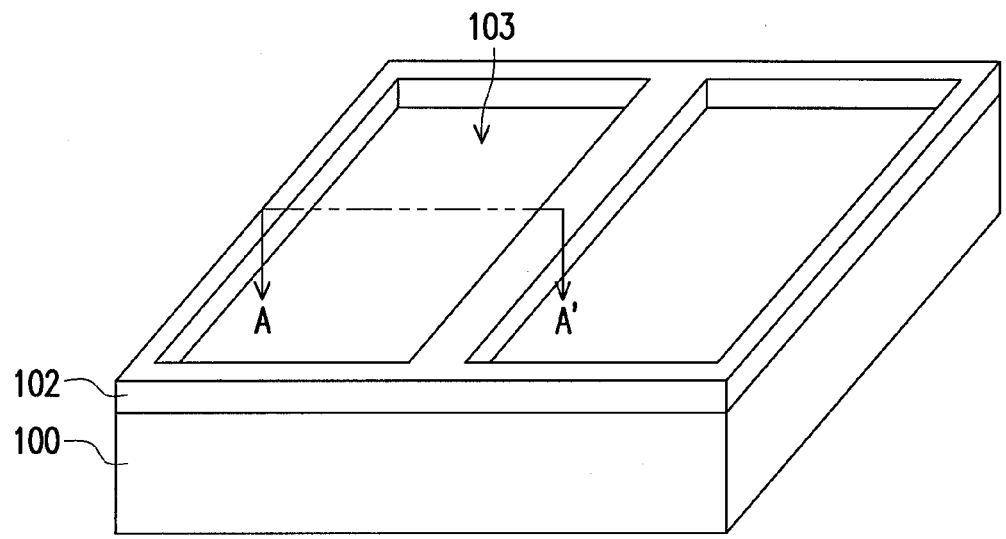
FIG. 1A to FIG. 1C are schematic views illustrating a manufacturing process of a color filter array according to an embodiment of the invention.
Figure 1B:
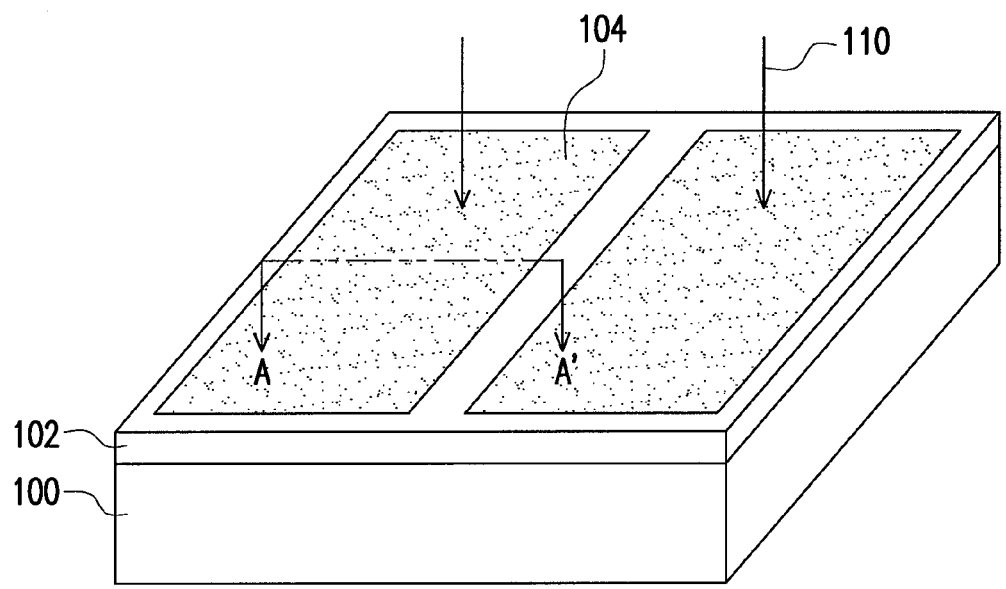
Figure 1C:
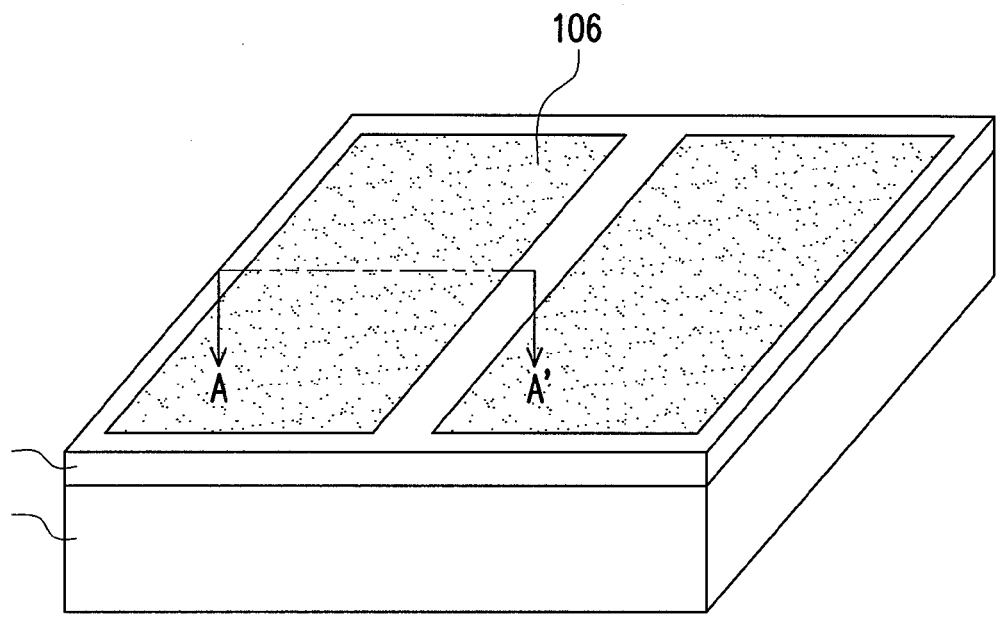
Figure 2A:
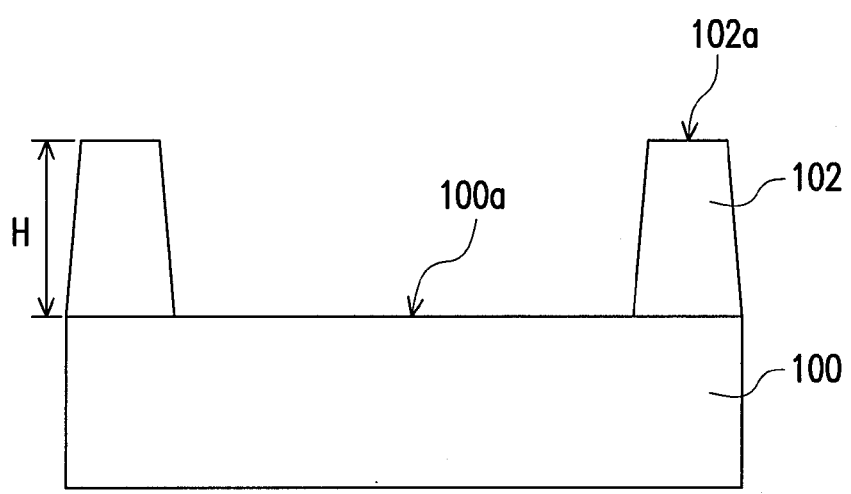
FIG. 2A to FIG. 2C are schematic cross-sectional views taken along a cross-sectional line A-A' depicted in FIG. 1A to FIG. 1C.
Figure 2B:
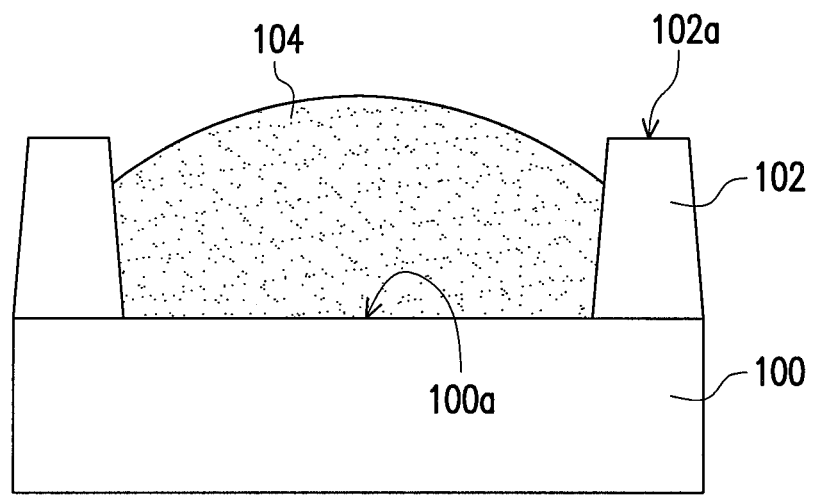
Figure 2C:
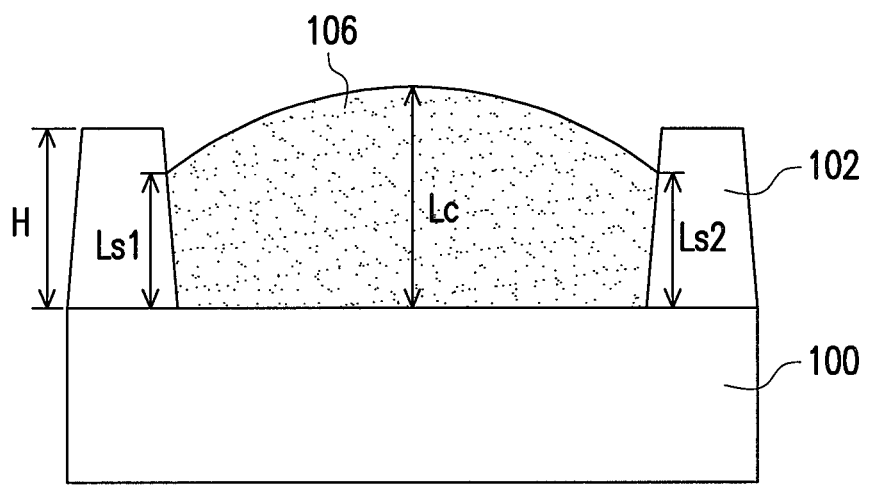

FIG. 1A to FIG. 1C are schematic views illustrating a manufacturing process of a color filter array according to an embodiment of the invention. FIG. 2A to FIG. 2C are schematic cross-sectional views taken along a cross-sectional line A-A' depicted in FIG. 1A to FIG. 1C. With reference to FIG. 1A and FIG. 2A, in the manufacturing method of the color filter array described in this embodiment, a substrate 100 is provided. The substrate 100 can be made of glass, quartz, an organic polymer, a non-light-transmissive/reflective material (such as a conductive material, metal, wafer, ceramics, or the like), or other suitable materials. Besides, the substrate 100 can be a simple blank substrate or a substrate on which other film layers or devices are formed. If the substrate 100 is a simple blank substrate, a simple color filter array is formed at last. However, a substrate having other film layers or devices (e.g., a pixel array) thereon can be formed on the simple color filter array. In this case, the structure that is eternally formed is an array on color filter (AOC) structure. If the substrate 100 already has other film layers or devices (e.g., a pixel array) thereon, the structure that is eternally formed is a color filter on array (COA) structure.

A light shielding layer 102 is formed on the substrate 100. The light shielding layer 102 has a plurality of openings 103 exposing a surface of the substrate 100. To clearly illustrate the color filter array structure of this embodiment, two openings 103 of the light shielding layer 102 are shown in the drawings. In fact, the light shielding layer 102 has two or more openings 103. Besides, in this embodiment, each of the openings 103 has a width of approximately 132 um to 135.5 um and a length of approximately 399 um to 428.5 um, but not limited it.

In this embodiment, a material of the light shielding layer 102 includes a photo-sensitive material or a non-photo-sensitive material. If the light shielding layer 102 is made of a photo-sensitive material, the light shielding layer 102 is formed by performing a coating process and a solidifying process to form a light shielding material layer (not shown) and then performing an exposure and development process directly on the light shielding material layer, for instance. By contrast, if the light shielding layer 102 is made of a non-photo-sensitive material, the light shielding layer 102 is formed by first forming a light shielding material layer (not shown) and then performing a photolithography process and an etching process to pattern the light shielding material layer, for instance. Alternatively, when the light shielding layer 102 is made of a non-photo-sensitive material, the light shielding layer 102 can also be formed by directly patterning the non-photo-sensitive material onto a substrate by screen printing or inkjet coating without performing the exposure and development process and the etching process.

The light shielding layer 102 of this embodiment has a height H. Besides, the vertical cross-section of the light shielding layer 102 as indicated in FIG. 2A is in a trapezoid shape, which should not be construed as a limitation to the invention. In other embodiments of the invention, the vertical cross-section of the light shielding layer 102 can also be in a rectangular shape, a square shape, or any other shape, or the vertical cross-section of the light shielding layer 102 having one of the above-mentioned shapes can be turned upside down.

With reference to FIG. 1B and FIG. 2B, an IJP process 110 is performed to inject color filter ink 104 into the openings 103 of the light shielding layer 102, respectively. In this embodiment, the color filter ink 104 injected into each opening 103 is red ink, green ink, or blue ink, for instance, but not limited it. Viscosity of the color filter ink 104 is approximately 10 c.P. to 14 c.P. In other embodiments of the invention, the number of the openings 103 can be three or more, and the color ink can be selected from any color having a chroma coordinate, e.g., yellow, purple, transparent, cyan, and so on.

It should be mentioned that lyophobic treatment can be performed on an upper surface 102a of the light shielding layer 102 before the IJP process 110 is carried out, such that the light shielding layer 102 can have a lyophobic surface 102a. In order to equip the light shielding layer 102 with the lyophobic surface 102a in this embodiment, lyophobic polymer may be added to a light shielding material layer in the process of forming the light shielding layer 102, for instance. When a heating process is subsequently performed on the light shielding material layer, the lyophobic polymer is moved to the top portion of the light shielding material layer, such that the top portion of the light shielding material layer can have lyophobic properties. Hence, when the light shielding material layer is patterned to form the light shielding layer 102, the upper surface 102a of the light shielding layer 102 is a lyophobic surface. However, the invention is not limited thereto. In other embodiments of the invention, a lyophobic film layer can be additionally formed on the upper surface of the light shielding layer 102, so as to equip the light shielding layer 102 with the lyophobic surface 102a.

Note that a surface 100a of the substrate 100 in this embodiment does not undergo any lyophilic treatment. Namely, it is not necessary to additionally perform lyophilic treatment on the surface 100a of the substrate 100 according to this embodiment, which should not be construed as a limitation to the invention. In other embodiments of the invention, the lyophilic treatment can still be performed on the surface 100a of the substrate 100.

As provided above, during the IJP process 110, the color filter ink 104 injected into the openings 103 is in contact with the surface 100a of the substrate 100. Besides, the light shielding layer 102 has the lyophobic surface 102a. Therefore, in the IJP process 110, the color filter ink 104 neither remains on the surface 102a of the light shielding layer 102 nor overflows into the adjacent openings 103.

A solidifying process is performed to solidify the color filter ink 104 and form a plurality of color filter patterns 106, as indicated in FIG. 1C and FIG. 2C. The solidifying process is, for instance, an irradiation solidifying process or a thermal solidifying process.

Specifically, in this embodiment, each of the color filter patterns 106 has the maximum film thickness Lc and the minimum film thickness Ls, and the difference between the maximum film thickness Lc and the minimum film thickness Ls is ΔL. The maximum film thickness Lc of each of the color filter patterns 106 satisfies (m×H)<Lc<(n×H), wherein m comprises about 0.83, n comprises about 0.91, the height H of the light shielding layer 102 satisfies a<H<b, wherein a comprises about 1.6 um and b comprises 2.22 um, and the difference ΔL is less than about 0.39 um.

To be more specific, the maximum film thickness Lc of each of the color filter patterns 106 is usually a film thickness of a central region of each of the color filter patterns 106. The minimum film thickness Ls of each of the color filter patterns 106 is a film thickness of each edge region at two sides of each color filter pattern 106. This is because the color filter patterns 106 of this embodiment are formed by performing the IJP process. When the color filter patterns 106 are formed by performing the IJP process, the cohesion of the color filter ink itself is greater than the adhesion between the color filter ink and the substrate, and thus the surface of the color filter ink at the central region is at a higher level than the surface of the color filter ink at the edge regions. When the difference ΔL between the maximum film thickness Lc and the minimum film thickness Ls of each of the color filter patterns 106 is overly large, i.e., when the difference in the height of regions in each of the color filter patterns 106 is excessively significant, the color performance of the display having the color filter array is negatively affected.

Figure 4:
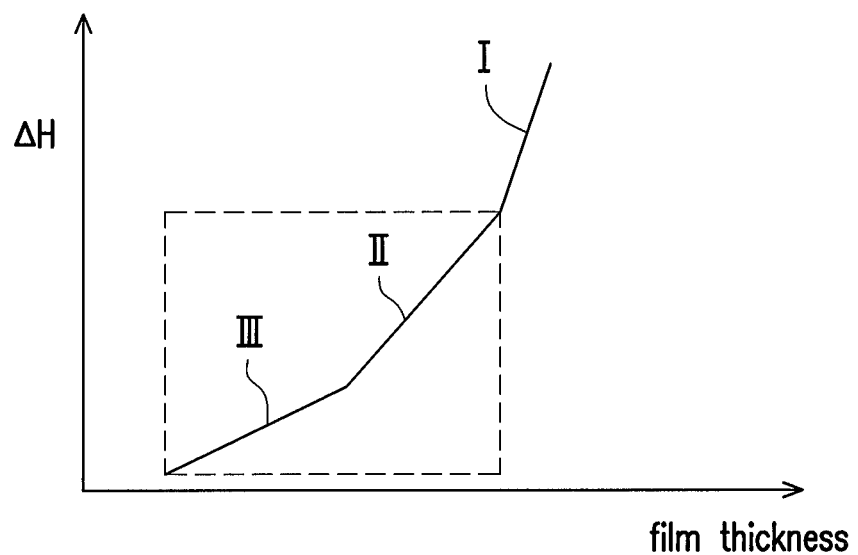
FIG. 4 shows the correlation between film thickness of each color filter pattern and the difference between the maximum film thickness and the minimum film thickness of each color filter pattern.

Additionally, the difference ΔL between the maximum film thickness Lc and the minimum film thickness Ls of each of the color filter patterns 106 is also determined based on the average film thickness of each of the color filter patterns 106 (i.e., the amount of the color filter ink). As shown in FIG. 4, the horizontal axis represents the average film thickness of each of the color filter patterns 106 (i.e., the amount of the color filter ink), and the vertical axis represents the difference ΔL between the maximum film thickness Lc and the minimum film thickness Ls of each of the color filter patterns 106. It can be learned from FIG. 4 that the difference ΔL between the maximum film thickness Lc and the minimum film thickness Ls of each of the color filter patterns 106 increases together with the increase in the average film thickness of each of the color filter patterns 106 (i.e., the amount of the color filter ink). In other words, when the correlation between the film thickness and the difference ΔL is as shown by curves III and II, the color performance of the color filter patterns 106 is fairly satisfactory. However, given that the correlation between the film thickness and the difference ΔL is as shown by the curve I, the color performance of the color filter patterns 106 is unfavorable. According to this embodiment, in order to ensure the color performance of the color filter array to reach a desirable level, the maximum film thickness Lc of each of the color filter patterns 106 satisfies (m×H)<Lc<(n×H), wherein m comprises about 0.83, n comprises about 0.91, and the height H of the light shielding layer 102 satisfies a<H<b, wherein a comprises about 1.6 um and b comprises 2.22 um, such that the difference ΔL can be less than about 0.39 um.

In view of the above, according to this embodiment, the minimum film thickness Ls is an average of the first minimum film thickness Ls1 and the second minimum film thickness Ls2 of each of the color filter patterns 106, and the first minimum film thickness Ls1 and the second minimum film thickness Ls2 are respectively a film thickness of two edge regions of each of the color filter patterns 106, as indicated in FIG. 2C. In this embodiment, the first minimum film thickness Ls1 and the second minimum film thickness Ls2 are respectively a film thickness of a region where each of the color filter patterns 106 is in contact with the light shielding layer 102.

According to an embodiment of the invention, the height H of the light shielding layer 102 is substantially 2.0 um, the maximum film thickness Lc of each of the color filter patterns 106 is substantially 1.75 um, and the first minimum film thickness Ls1 and the second minimum film thickness Ls2 of each of the color filter patterns 106 are substantially 1.49 um and 1.41 um, respectively. At this time, the difference ΔL is substantially 0.30 um.

Figure 3:
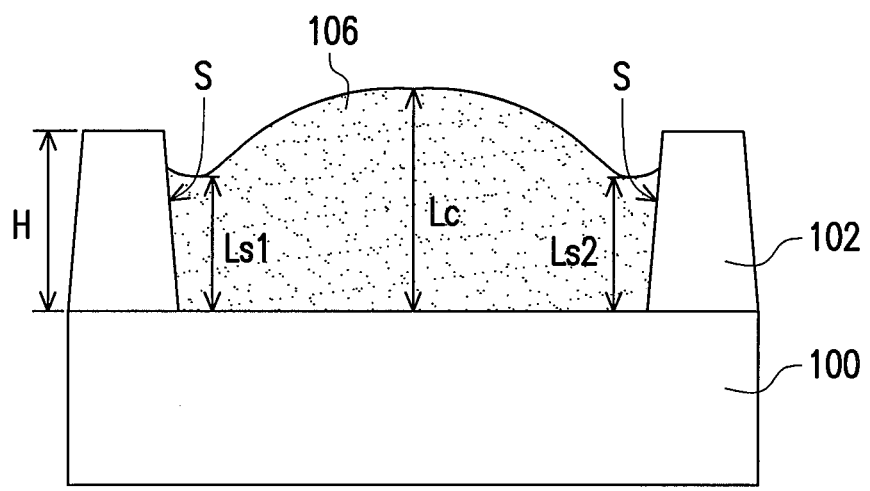
FIG. 3 is a schematic cross-sectional view illustrating a portion of a color filter array according to another embodiment of the invention.

As described in the previous embodiment and depicted in FIG. 2C, the first minimum film thickness Ls1 and the second minimum film thickness Ls2 of each of the color filter patterns 106 are respectively the film thickness of the region where each of the color filter patterns 106 is in contact with the light shielding layer 102. However, the invention is not limited thereto. In other embodiments of the invention, as indicated in FIG. 3, the first minimum film thickness Ls1 and the second minimum film thickness Ls2 of each of the color filter patterns 106 are respectively the film thickness of the two edge regions of each of the color filter patterns 106, and the two edge regions are not in contact with the sides S of the light shielding layer 102.

When the color filter patterns 106 are formed by performing the IJP process, the surface of the color filter ink at the central region is at the highest level, and the surface of the color filter ink at the two edge regions (not in contact with the sides S of the light shielding layer 102) is at the lowest level. Accordingly, after the solidifying process is performed, the upper surface of each color filter pattern 106 has the profile shown in FIG. 3.

Similarly, in this embodiment, the maximum film thickness Lc of each of the color filter patterns 106 satisfies (m×H)<Lc<(n×H), wherein m comprises about 0.83, n comprises about 0.91, the height H of the light shielding layer 102 satisfies a<H<b, wherein a comprises about 1.6 um and b comprises 2.22 um, and the difference ΔL is less than about 0.39 um. Preferably, the height H of the light shielding layer 102 is substantially 2.0 um, the maximum film thickness Lc of each of the color filter patterns 106 is substantially 1.75 um, and the first minimum film thickness Ls1 and the second minimum film thickness Ls2 of each of the color filter patterns 106 are substantially 1.49 um and 1.41 um, respectively. At this time, the difference ΔL is substantially 0.30 um.

In light of the foregoing, as described in the embodiments of the invention, the maximum film thickness Lc of each of the color filter patterns satisfies (m×H)<Lc<(n×H), wherein m comprises about 0.83, n comprises about 0.91, the height H of the light shielding layer satisfies a<H<b, wherein a comprises about 1.6 um and b comprises 2.22 um, and the difference ΔL is less than about 0.39 um. Since the difference ΔL between the maximum film thickness Lc and the minimum film thickness Ls of each of the color filter patterns is less than about 0.39 um, the film thickness of each of the color filter patterns can be even and uniform, and further the display having the color filter array can have favorable color display performance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A color filter array comprising:
   a substrate;
   a light shielding layer located on the substrate and having a plurality of openings, the openings exposing a surface of the substrate, the light shielding layer having a height H; and
   a plurality of solidified color filter patterns respectively located in the openings of the light shielding layer, each of the solidified color filter patterns has a maximum film thickness Lc and a minimum film thickness Ls, a difference between the maximum film thickness Lc and the minimum film thickness Ls being ΔL, wherein
   the maximum film thickness Lc is a film thickness of a central region of each of the solidified color filter patterns,
   the maximum film thickness Lc of each of the solidified color filter patterns satisfies (m×H)<Lc<(n×H), wherein m comprises 0.83, n comprises 0.91,
   the height H of the light shielding layer satisfies a<H<b, wherein a comprises 1.6 μm and b comprises 2.22 μm, and
   the difference ΔL is less than 0.39 μm, such that a surface of each of the solidified color filter patterns has a convex shape in the central region.

2. The color filter array of claim 1, wherein the minimum film thickness Ls is an average of a first minimum film thickness Ls1 and a second minimum film thickness Ls2 of each of the solidified color filter patterns, and the first minimum film thickness Ls1 and the second minimum film thickness Ls2 are respectively a film thickness of two edge regions of each of the solidified color filter patterns.

3. The color filter array of claim 2, wherein the first minimum film thickness Ls1 and the second minimum film thickness Ls2 are respectively a film thickness of a region where each of the solidified color filter patterns is in contact with the light shielding layer.

4. The color filter array of claim 2, wherein the first minimum film thickness Ls1 and the second minimum film thickness Ls2 are respectively the film thickness of the two edge regions of each of the solidified color filter patterns, and the two edge regions are not in contact with the light shielding layer.

5. The color filter array of claim 1, wherein the height H of the light shielding layer is substantially 2.0 μm, the maximum film thickness Lc of each of the solidified color filter patterns is substantially 1.75 μm, and the difference ΔL is substantially 0.30 μm.

6. The color filter array of claim 5, wherein the first minimum film thickness Ls1 and the second minimum film thickness Ls2 are substantially 1.49 μm and 1.41 μm, respectively.

7. The color filter array of claim 1, wherein an upper surface of the light shielding layer undergoes lyophobic treatment.

8. The color filter array of claim 1, wherein the surface of the substrate does not undergo lyophilic treatment, and each of the solidified color filter patterns is in contact with the surface of the substrate which does not undergo the lyophilic treatment.

9. A manufacturing method of a color filter array, comprising:
   providing a substrate;
   forming a light shielding layer on the substrate, the light shielding layer having a plurality of openings, the openings exposing a surface of the substrate, the light shielding layer having a height H;
   performing an inkjet printing process to inject color filter ink into the openings of the light shielding layer; and
   performing a solidifying process to solidify the color filter ink to form a plurality of solidified color filter patterns, each of the solidified color filter patterns has a maximum film thickness Lc and a minimum film thickness Ls, a difference between the maximum film thickness Lc and the minimum film thickness Ls is ΔL, wherein
   the maximum film thickness Lc is a film thickness of a central region of each of the solidified color filter patterns,
   the maximum film thickness Lc of each of the solidified color filter patterns satisfies (m×H)<Lc<(n×H), wherein m comprises 0.83, n comprises 0.91,
   the height H of the light shielding layer satisfies a<H<b, wherein a comprises 1.6 μm and b comprises 2.22 μm, and
   the difference ΔL is less than 0.39 μm, such that a surface of each of the solidified color filter patterns has a convex shape in the central region.

10. The manufacturing method of the color filter array of claim 9, wherein viscosity of the color filter ink is substantially 10 cP~14 cP.

11. The manufacturing method of the color filter array of claim 9, wherein the minimum film thickness Ls is an average of a first minimum film thickness Ls1 and a second minimum film thickness Ls2 of each of the solidified color filter patterns, and the first minimum film thickness Ls1 and the second minimum film thickness Ls2 are respectively a film thickness of two edge regions of each of the solidified color filter patterns.

12. The manufacturing method of the color filter array of claim 11, wherein the first minimum film thickness Ls1 and the second minimum film thickness Ls2 are respectively a film thickness of a region where each of the solidified color filter patterns is in contact with the light shielding layer.

13. The manufacturing method of the color filter array of claim 11, wherein the first minimum film thickness Ls1 and the second minimum film thickness Ls2 are respectively the film thickness of the two edge regions of each of the solidified color filter patterns, and the two edge regions are not in contact with the light shielding layer.

14. The manufacturing method of the color filter array of claim 9, wherein the height H of the light shielding layer is substantially 2.0 μm, the maximum film thickness Lc of each of the solidified color filter patterns is substantially 1.75 μm, and the difference ΔL is substantially 0.30 μm.

15. The manufacturing method of the color filter array of claim 14, wherein the first minimum film thickness Ls1 and the second minimum film thickness Ls2 are substantially 1.49 μm and 1.41 μm, respectively.

16. The manufacturing method of the color filter array of claim 9, further comprising performing lyophobic treatment on an upper surface of the light shielding layer.

17. The manufacturing method of the color filter array of claim 9, wherein the surface of the substrate does not undergo lyophilic treatment, and each of the solidified color filter patterns is in contact with the surface of the substrate which does not undergo the lyophilic treatment.

* * * * *